(12) United States Patent
Finnance (10) Patent No.: US 12,471,731 B2
(45) Date of Patent: Nov. 18, 2025

(54) JUICER

(71) Applicant: Capbran Holdings, LLC, Los Angeles, CA (US)

(72) Inventor: Robert Finnance, Los Angeles, CA (US)

(73) Assignee: Capbran Holdings, LLC, Los Angeles, CA (US)

( * ) Notice: Subject to any disclaimer, the term of this patent is extended or adjusted under 35 U.S.C. 154(b) by 1019 days.

(21) Appl. No.: 17/190,858

(22) Filed: Mar. 3, 2021

(65) Prior Publication Data

US 2022/0279955 A1 Sep. 8, 2022

(51) Int. Cl.
*A47J 19/02* (2006.01)
*A47J 19/06* (2006.01)

(52) U.S. Cl.
CPC .................................. *A47J 19/02* (2013.01)

(58) Field of Classification Search
CPC  A47J 19/02; A47J 19/027; A47J 19/06; A47J 19/023; A47J 36/32; A47J 37/0835; A47J 43/04; A47J 43/06; A47J 43/0716; A47J 43/0727; A23N 1/00; A23N 1/02; A23N 1/003
USPC ..................................................... 99/501–513
See application file for complete search history.

(56) References Cited

U.S. PATENT DOCUMENTS

| | | | |
|---|---|---|---|
| 2,981,040 A * | 4/1961 | Mapes | B65B 5/065 53/496 |
| 3,101,107 A | 8/1963 | Posener et al. | |
| 3,255,566 A * | 6/1966 | Shazor, Jr. | B65D 67/02 53/413 |
| 4,345,517 A | 8/1982 | Arao et al. | |
| 4,350,087 A * | 9/1982 | Ramirez | A47J 19/027 99/511 |
| 4,506,601 A * | 3/1985 | Ramirez | A47J 19/027 99/511 |
| 5,289,763 A * | 3/1994 | Le Rouzic | A47J 19/027 99/503 |
| 5,479,851 A | 1/1996 | McClean et al. | |
| 5,784,954 A * | 7/1998 | Kokot | A47J 19/027 241/37.5 |
| 6,050,180 A * | 4/2000 | Moline | A47J 19/027 241/37.5 |
| 6,135,019 A * | 10/2000 | Chou | A47J 43/0716 366/205 |
| 9,016,196 B2 * | 4/2015 | Hensel | A47J 19/027 241/37.5 |

(Continued)

OTHER PUBLICATIONS

Notification of Transmittal of the International Search Report and the Written Opinion of the International Searching Authority, or the Declaration, Re: International App. No. PCT/US22/17347 (Date of Mailing: May 11, 2022).

*Primary Examiner* — Eric S Stapleton
(74) *Attorney, Agent, or Firm* — Trojan Law Offices (57) ABSTRACT

This application is for an improved juicer that can process a foodstuff to produce a juice and a pulp. The improved juicer can prevent the produced pulp from interfering with the functionality of the improved juicer by preventing the pulp from impacting critical areas within the improved juicer. The improved juicer can block the pulp from impacting and disrupting airtight seals that otherwise would allow air to escape and juice to escape during processing. A method of manufacturing the improved juicer is also described.

18 Claims, 10 Drawing Sheets

(56) References Cited

U.S. PATENT DOCUMENTS

| | | | | |
|---|---|---|---|---|
| 9,149,065 | B2* | 10/2015 | Hoare | A23N 1/02 |
| 9,456,712 | B2* | 10/2016 | Brenna | A47J 19/027 |
| 9,565,872 | B2* | 2/2017 | Corkin | A23N 1/02 |
| 2003/0116033 | A1 | 6/2003 | Areh et al. | |
| 2006/0065133 | A1* | 3/2006 | Moline | A47J 19/027 |
| | | | | 99/511 |
| 2006/0086261 | A1 | 4/2006 | Cohen et al. | |
| 2006/0191425 | A1* | 8/2006 | Chang | A47J 43/0722 |
| | | | | 99/511 |
| 2015/0245651 | A1* | 9/2015 | Ramusch | A23N 1/02 |
| | | | | 99/513 |
| 2016/0000136 | A1* | 1/2016 | Carley | A23N 1/02 |
| | | | | 99/513 |
| 2017/0095122 | A1* | 4/2017 | Hoare | A23N 1/003 |

* cited by examiner fig.1

JUICER

FIELD OF THE INVENTION

This application relates to an improved juicer to prevent pulp produced during processing of a foodstuff from interfering with the functionality of the juicer.

BACKGROUND OF THE INVENTION

Juicers are appliances enjoyed by millions of users worldwide for their delicious health benefits. Juicers extract the juice from foodstuffs by crushing, grinding, cutting, chopping, and/or squeezing fruits, herbs, leafy greens, vegetables, nuts, and others in a process known as juicing. The health benefits of juicing include a great way to increase fresh fruits and vegetables and their respective vitamins, minerals, antioxidants, and phytonutrients in one's diet. Other benefits include better nutrient absorption, cancer risk reduction, immunity system boosting, toxin removal, aid in digestion, and weight loss.

Juicers come in various types. A popular type of juicer is a centrifugal juicer that receives foodstuffs such as fruits and vegetables through a feed tube leading to a rotating surface that can have teeth, blades, and/or other serrated mechanisms. The foodstuff is put into contact with the rotating surface rotating at approximately 6,000 to 14,000 RPMs. Centrifugal force separates the juice from the pulp and forces the juice to move through a meshed surface such as a sieve or strainer. The juice, now separated from the pulp, can be enjoyed by the user. The pulp left behind can be discarded or used for other purposes by the user. Other types of juicers include masticating juicers, twin gear juicers, and juice presses.

Although centrifugal juicers enjoy many benefits such as fast juicing time, they also present certain challenges. For example, the pulp produced is under the influence of the same centripetal forces as the juice. These forces force the pulp out of the processing area and into a pulp collection area. These forces can also project the pulp against the walls of the juicer and any seams or seals, such as those created between the walls and any lids. The impact of the projected pulp against these areas can compromise airtightness, which can result in air escaping and juice leaking through these unwanted gaps.

Thus, there is a need for an improved juicer that prevents the produced pulp from impacting vulnerable areas of the juicer during processing. There is also a need for a juicer that retains airtightness by preventing certain impacts that can compromise seals, seams, and the like. There is further a need for juicer that prevents juice from escaping from the juicer resulting in lost product, disruption in the juicing process, and unwanted mess and cleanup. And there is a need for a method to manufacture and create such an improved juicer as described above.

SUMMARY OF THE INVENTION

The systems and techniques disclosed herein feature an improved juicer for processing a foodstuff to produce juice and pulp. The improved juicer can prevent the pulp produced during the processing of the foodstuff from interfering with the functionality of the juicer. For example, the improved juicer can block the pulp produced from impacting seams or seals formed by components of the juicer.

In one aspect, the systems and techniques disclosed here feature an improved juicer configured to process a foodstuff to produce a juice and a pulp. The improved juicer can have a motor base with a motor. The improved juicer can also have a juicer bin. The juicer bin can have an outer juicer bin wall and an inner juicer bin wall. The motor base can be adapted to receive the juicer bin. The improved juicer can also have a sieve basket. The sieve basket can have a sieve basket bottom and a sieve wall. The sieve basket can be adapted to be coupled with the motor.

The improved juicer can also have a juicer bin lid. The juicer bin lid can be adapted to form a seal with the juicer bin. The seal between the juicer bin lid and the juicer bin can be airtight. The juicer bin lid can also have a feeding tube, and the feeding tube can receive foodstuff to be processed by the improved juicer. The improved juicer can also have a pusher. The pusher can be adapted to push foodstuff down the feeding tube for processing the foodstuff by the improved juicer. For example, the foodstuff can be an apple that can be pushed down the feeding tube by the pusher. By pushing the apple down the feeding tube, the pusher can move the apple into an area to be processed into juice and pulp.

The juicer bin lid can also have an inner juicer bin lid wall extending from the bottom of the juicer bin lid. The inner juicer bin lid wall can be positioned to prevent the pulp produced during the processing of the foodstuff from interfering with the operation of the improved juicer. For example, the inner juicer bin lid wall can be positioned to block pulp from impacting the seals formed between the juicer bin and the juicer bin lid.

Implementations may include one or more of the following features.

One feature may be the juicer bin configuration. For example, the juicer bin can have a spout. The spout can be an anti-drip spout. The inner juicer bin wall can define an area within the juicer bin. This area inside the inner juicer bin wall can be a juice collection chamber. The juice collection chamber can be an uncovered area within the juicer bin. The outer juicer bin wall can also define an area within the juicer bin. This area inside the outer juicer bin wall and outside the inner juicer bin wall can be a pulp collection chamber. The pulp collection chamber can be an uncovered area within the juicer bin. The inner juicer bin wall can surround the sieve basket. The sieve basket can be positioned adjacent to the inner juicer bin wall. The sieve basket can also be positioned with a gap between the inner juicer bin wall. The sieve basket can also rest upon the inner juicer bin wall. The sieve basket can cover the uncovered area of the juice collection chamber.

Another feature may be the motor base configuration. The motor base can have various actuation devices such as buttons and/or dials for operating the motor and the improved juicer such as turning the motor on and choosing a motor operation speed. The motor base can also have a bail handle. The bail handle can be attached to the motor base at a bail handle pivot point. The bail handle pivot point can be attached to a spring. The bail handle can be moved into a position where it rests within a bail handle rest. The bail handle rest can be attached to the juicer bin lid.

Another feature may be the motor base can utilize a motor base adapter. The motor base adapter can enable an apparatus to be coupled with the motor base for operation. For example, the motor base can be coupled to the motor base adapter and the motor base adapter can be coupled to the sieve basket. The improved juicer can be operated with the motor base adapter in a manner similar to an embodiment in which the motor base is directly coupled to the sieve basket. The motor base can also be configured to operate other foodstuff processing devices, such as a blender. The motor base adapter can enable the improved juicer to be operated with a plurality of motor bases. The improved juicer can also be configured to operate with a motor base that is capable of operating with a plurality of devices with or without other adapting devices similar to the motor base adapter.

Another feature may be how the motor, sieve basket, and pusher work together for processing foodstuff. For example, the motor can rotate the sieve basket. The sieve wall can have a semipermeable sieve mesh that prevents certain materials from passing through. For example, the sieve mesh can compromise a plurality of metal wires forming a mesh of the wires woven together. The pusher can also force the foodstuff against the sieve basket bottom before, during, and after activating the motor to rotate the sieve basket. The rotation of the sieve basket caused by the motor can create a centrifugal force. This centrifugal force can encourage an outward projection of the juice and the pulp produced from the foodstuff.

Under the influence of the centrifugal force created by the motor rotating the sieve basket, the juice produced during the processing of the foodstuff can move from approximately the center of the sieve basket towards the sieve wall. The sieve mesh of the sieve wall can be of a certain density that allows the juice to move through the sieve wall and into the juicing collection chamber. This centrifugal force can also be applied to the pulp produced during processing. Juice remaining in the pulp can be extracted from the pulp by being forced against the sieve mesh of the sieve wall. The juice can remain in the juice collection chamber until a user chooses to withdraw it.

The sieve basket can also prevent the pulp from entering the juice collection chamber. For example, the sieve mesh of the sieve wall can be of a certain density that prevents solids such as the pulp from passing through the sieve wall and entering the juice collection chamber.

The centrifugal force created by the motor rotating the sieve basket can move the pulp produced during processing to the pulp collection chamber. The projected pulp can also be projected to other areas within the juicer bin. For example, the centrifugal force can project the pulp from the sieve basket in an outwards direction towards the outer juicer bin wall. The pulp projected towards the outer juicer bin wall can be collected within the pulp collection chamber. The inner juicer bin wall can segregate the pulp within the pulp collection chamber from the juice collection chamber. The pulp within the pulp collection chamber can be cleaned and removed at a later time by the user.

Another feature may be the sieve basket configuration. For example, the sieve wall of the sieve basket can be in a frustoconical shape. The sieve wall can also be in other shapes, such as a cylinder. The sieve wall can have a sieve wall bottom end and a sieve wall top end. The sieve wall bottom end can be fitted around the sieve basket bottom. The sieve wall bottom end and the sieve wall top end can be of various sizes to fit the needs of the juicer. For example, the sieve wall top end can have a circumference larger than the circumference of the sieve basket bottom. The sieve basket can also have a lip, such as a lip on the top end of the sieve wall.

The sieve basket bottom can have features for cutting, grinding, and/or processing the foodstuff. For example, the sieve basket bottom can be grated. The sieve bottom basket can also have teeth. The sieve bottom basket can also have serrated edges. Features such as these can aid in cutting, grinding, and/or processing the foodstuff particularly when the sieve basket is coupled to the motor and the motor is activated and rotating the sieve basket.

Another feature may be the juicer bin lid configuration. For example, the juicer bin lid can rest upon the juicer bin to form a seal. The juicer bin lid can have an outer juicer bin lid wall that can be fitted within a complimentary space formed within the outer juicer bin wall. The juicer bin lid can also be joined to the juicer bin via a physical system to form a seal. For example, the juicer bin lid can be joined to the juicer bin via complimentary threads on the juicer bin lid and the juicer bin. The inner juicer bin lid wall can have a circumference larger than the circumference of the inner juicer bin wall. The inner juicer bin lid wall can also have a circumference smaller than the circumference of the outer juicer bin wall. The inner juicer bin lid wall can also surround the sieve basket. The juicer bin lid can be made up of various lengths. For example, the inner juicer bin lid wall can have a length such that the bottom end of the inner juicer bin lid wall is lower than the top end of the inner juicer bin wall or the top end of the sieve basket when the improved juicer is assembled.

The projection of the pulp out of the sieve by the centrifugal force created by the motor rotating the sieve basket can create violent impacts within the improved juicer and/or the juicer bin. For example, the projected pulp can impact and potentially disrupt the seal formed between the juicer bin lid and the juicer bin. Such an impact can potentially compromise an airtight seal formed between the juicer bin lid and the juicer bin. This can result in air escaping from the juicer bin and juice leaking out.

The inner juicer bin lid wall can prevent pulp produced from interfering with the functionality of the improved juicer. For example, the inner juicer bin lid wall can block the pulp projected by the centrifugal force created by the motor rotating the sieve basket. The projected pulp can impact the inner juicer bin wall and fall down into the pulp collection bin. The inner juicer bin lid, by blocking the projected pulp in such a manner, can prevent the projected pulp from impacting the outer juicer bin wall or an approximate area at or near the seal formed between the juicer bin lid and the juicer bin. The inner juicer bin lid wall can prevent potential disruption of operation of the improved juicer by, for example, preventing physical impact in certain areas.

Another feature may be the configuration of the pusher. For example, the pusher can be fitted to approximate the size and shape of the feeding tube. The pusher can also be fitted to be pushed down the entire length of the feeding tube. A narrow pusher chute can be fitted within the feeding tube for use with a narrow pusher. The narrow pusher chute can narrow the effective cavity area of the feeding tube. The narrow pusher chute can effectively reduce the feeding tube size for use with various foodstuffs and the narrow pusher can push various foodstuffs down the same.

Another feature may be operation features of the improved juicer such as safety features for ensuring safe operation of the improved juicer. The bail handle can lock the juicer bin lid onto the juicer bin by rotating the bail handle from a first bail handle position to a second bail handle position. The first bail handle position can be a horizontal bail handle position and the second bail handle position can be a vertical bail handle position. For example, the bail handle can be rotated upwards from a first bail handle position that is approximately adjacent to the motor base to a second vertical bail handle position that is approximately above the juicer bin lid and juicer bin. The bail handle can be fitted within the bail handle rest. This can ensure that the juicer bin lid remains on top of the juicer bin during operation of the improved juicer.

Moving the bail handle can also enable operation of the motor. For example, moving the bail handle from a first bail handle position to a second bail handle position can trigger a microswitch that actuates the motor for operation. The motor base can have one or a plurality of microswitches. Microswitches can also be used with the base adapter such that the motor can be enabled under a plurality of conditions. For example, the motor base, with or without a motor base adapter, can detect that a juicer apparatus has been coupled with the motor. The microswitches enabling the motor can ensure that the motor cannot be operated until certain conditions, such as the juicer bin lid being on top of the juicer bin and locked in place, are met.

In another aspect, the systems and techniques disclosed here feature a method of manufacturing an improved juicer for processing a foodstuff to produce juice and pulp and capable of blocking the produced pulp from interfering with the processing.

Implementations may include one or more of the following features.

For example, a method for manufacturing an improved juicer can include producing a motor base, producing a juicer bin, producing a sieve basket, producing a juicer lid, and producing a pusher. The motor base, the juicer bin, the sieve basket, the juicer bin lid, and the pusher can be manufactured to be assembled together. The motor base can be produced to be coupled with the sieve basket. A motor base adapter can also be produced to be coupled with the motor base and to be coupled with the sieve basket. The motor base adapter can also be manufactured to be assembled together with the motor base, the juicer bin, the sieve basket, the juicer bin lid, and the pusher. The improved juicer can compromise a plurality of materials including plastics, metals, glass, composites, and/or other materials.

Another feature of the method may be the juicer bin can be produced with an open top. The juicer bin can also be produced with a spout. The juicer bin can also be produced with an inner juicer bin wall that can define a juice collection chamber. The juicer bin can also be produced with an outer juicer bin wall that can define a pulp collection chamber that is outside the inner juicer bin wall. The juicer bin, the outer juicer bin wall, and the inner juicer bin wall can be produced in various shapes. For example, the juicer bin, the outer juicer bin wall, and the inner juicer bin wall can be produced in the shape of circles and/or concentric circles. The juicer bin, the outer juicer bin wall, and the inner juicer bin wall can also be produced in other various shapes. The juicer bin, the outer juicer bin wall, and the inner juicer bin wall can be produced as one continuous apparatus.

Another feature of the method may be the sieve basket can be produced with a sieve comprising a mesh of materials such as metal, plastic, composites, and/or other materials. The sieve mesh can be produced as part of a sieve wall in various forms such as a continuous wall and/or panels. The sieve basket can be produced with a sieve basket bottom that can be produced grated, with teeth, and/or with serrated edges. The sieve basket can be produced to be coupled with the motor base. The sieve basket can also be produced to be coupled with a motor base adapter.

Another feature of the method may be the juicer bin lid can be produced to be fitted on top of the juicer bin. The juicer bin lid can also be produced to be physically joined to the juicer bin, such as with a complimentary thread system. The juicer bin lid can be produced to form a seal with the juicer bin, such as an airtight seal on top of the juicer bin.

The juicer bin lid can be produced with a feeding tube for foodstuff to enter. The pusher can be produced to be fitted for pushing foodstuff down the feeding tube to be processed. The juicer bin lid can be produced with an inner juicer bin lid wall extending from the bottom of the juicer bin lid. The inner juicer bin lid wall can be designed to block the pulp produced during the processing of the foodstuff from interfering with the operations of the improved juicer. For example, the inner juicer bin lid wall can be designed to be extend far enough to block the pulp from impacting and disrupting an airtight seal formed between the juicer bin lid and the juicer bin.

DETAILED DESCRIPTION OF THE DRAWINGS

FIGS. 1 through 4 demonstrate a first embodiment of an improved juicer 1 from various perspectives.

Figure 1:
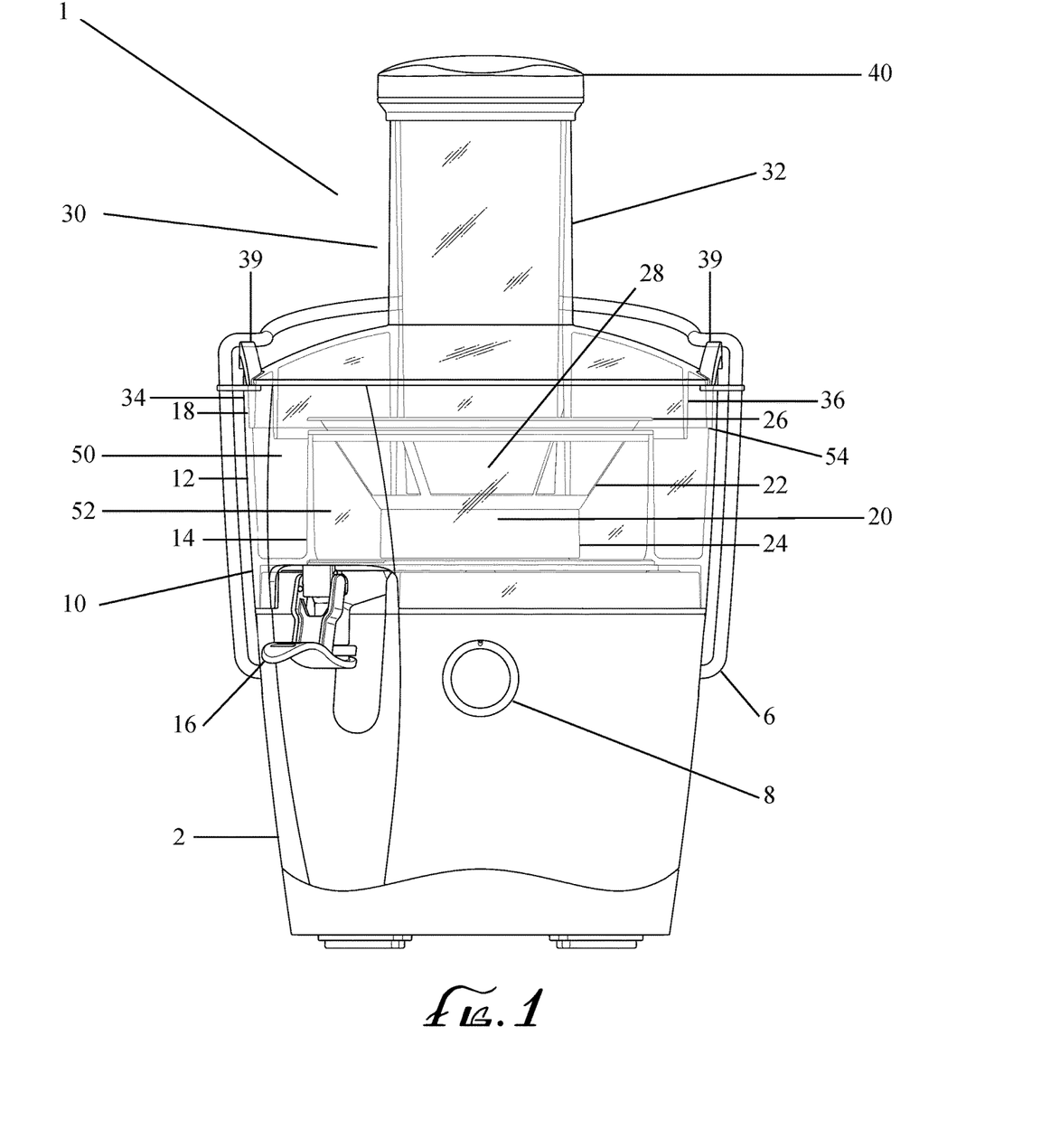
FIG. 1 is a front perspective view a first embodiment of an improved juicer.

FIG. 1 demonstrates a motor base 2 supporting a juicer bin 10. A bail handle 6 is shown attached to the motor base 2 rotated to a vertical bail handle position where it rests within bail handle rests 39. An actuation dial 8 is shown on the outer surface of the motor base 2 and can be used by a user to control the operation of the improved juicer 1. For example, the actuation dial 8 can activate the motor within the motor base 2 or control the speed of the motor.

FIG. 1 further demonstrates the juicer bin 10 shown with an outer juicer bin wall 12 that defines the outer surface of the juicer bin 10. Further within the juicer bin 10 is an inner juicer bin wall 14. The volume defined by the space between the outer juicer bin wall 12 and the inner juicer bin wall 14 is the pulp collection chamber 50. The pulp collection chamber 50 is the volume in which pulp produced is collected and stored until later removed and cleaned by a user. The volume defined by the space encompassed by the inner juicer bin wall 14 is the juice collection chamber 52. The juice collection chamber 52 is the volume in which juice produced is collected and stored until a user chooses to withdraw it, such as by actuation of a spout 16. The spout 16 as shown attached to the juicer bin 10 is an anti-drip spout.

FIG. 1 further demonstrates a sieve basket 20. The sieve basket 20 is shown with a sieve wall 22 in an embodiment with a frustoconical shape. In this form, the sieve basket 20 tapers from an open top end to a sieve basket bottom 24. The sieve wall 22 is shown with various sections that can be a mesh matrix encompassing interwoven materials. For example, the mesh matrix can encompass metal wires of a desired thickness interwoven to create a desired density for a semipermeable surface that allows liquids such as juice to pass through and solids such as pulp to be blocked from passing through. The sieve basket bottom 24 can have designs and materials for processing foodstuff. For example, the sieve basket bottom 24 can be grated, have teeth, have serrated edges, and/or other materials or designs for processing foodstuff. The open top end of the sieve basket 20 is shown to have a sieve basket top lip 26 on top of the sieve wall 22. The volume defined by the space encompassed within the sieve wall 22, sieve basket bottom 24, and sieve basket top lip 26 is the processing area 28. The sieve basket top lip 26 as shown is adjacent to the top surface of the inner juicer bin wall 14. The sieve basket 20 as shown encloses the juice collection chamber 52. Materials moving from the processing area 28 to the juice collection chamber 52 must move through the semipermeable surface of the sieve wall 22.

FIG. 1 further demonstrates a juicer bin lid 30, a feeding tube 32, an outer juicer bin lid wall 34, an inner juicer bin lid wall 36, and a pusher 40. The juicer bin lid 30 is shown in a resting position on top of the juicer bin 10 at a juicer bin top recess 18 forming a juicer bin seal 54 between the juicer bin lid 30 and the juicer bin 10. The juicer bin seal 54 as shown is airtight so that air does not escape and juice does not leak during foodstuff processing or other activities. The inner juicer bin lid wall 36 is shown having a circumference larger than the circumference of the inner juicer bin wall 14 and the circumference of the sieve basket top lip 26. The inner juicer bin lid wall 36 is shown with a vertical length that extends below the juicer bin seal 54. The pusher 40 is shown inside the feeding tube 32 in a position extended down such that the bottom of the pusher 40 touches the sieve basket bottom 24. The bail handle rest 39 supports the bail handle 6 when the motor base 2, juicer bin 10, and juicer bin lid 30 are assembled and the bail handle 6 is moved into a vertical bail handle position.

Foodstuff enters the processing area 28 through feeding tube 32. When the motor in motor base 2 rotates the sieve basket 20, the foodstuff within the processing area 28 (ideally between the sieve basket bottom 24 and the pusher 40) is processed to produce juice and pulp. The rotation of the sieve basket 20 by the motor creates a centrifugal force that projects the processed materials in a radially outwards direction from approximately the center of the sieve basket 20. The produced juice and pulp are projected against the sieve wall 22. The produced liquid juice passes through the sieve mesh of the sieve wall 22 and enters the juice collection chamber 52. The pulp is blocked by the sieve mesh of the sieve wall 22 and does not enter the juice collection chamber 52. Juice remaining in the pulp can be further extracted by the centrifugal force being applied to the pulp to be forced against the sieve wall 22.

The centrifugal force also projects the pulp out of the sieve basket 20 and into other areas of the juicer bin 10, such as the pulp collection chamber 50. The inner juicer bin lid wall 36 is positioned such that pulp projected from the sieve basket 20 will impact the inner juicer bin lid wall 36 and fall down into the pulp collection chamber 50. Without the inner juicer bin lid wall 36, the pulp could be projected throughout the juicer bin 10 and the outer juicer bin wall 12. Moreover, the pulp could potentially impact and disrupt airtight seals such as the juicer bin seal 54. Disrupting the juicer bin seal 54 can cause air to escape from the juicer bin 10 and juice to leak. This can cause the loss of valuable juice produced from foodstuff, damage to the machinery, and the spillage of juice and other foodstuff products.

Figure 2:
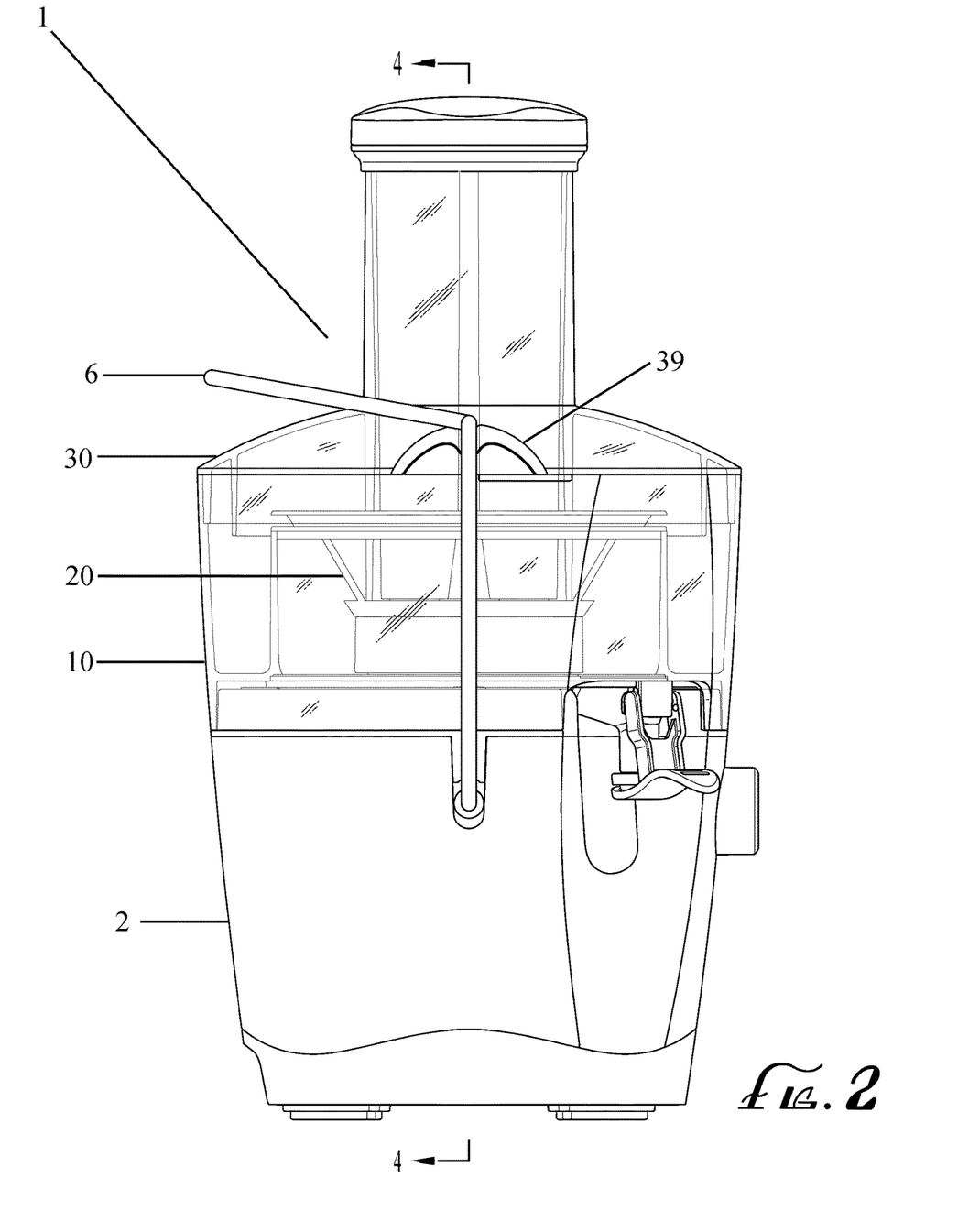
FIG. 2 is a side perspective view of the improved juicer of FIG. 1.

FIG. 2 demonstrates the improved juicer 1 from a side view perspective. The bail handle 6 is shown in a vertical bail handle position. In this position the bail handle 6 has been rotated upwards or clockwise from a horizontal bail handle position with the bail handle 6 rotating about bail handle pivot points 7 connected to the motor base 2. The bail handle 6 is shown in a vertical bail handle position where it rests within the bail handle rest 39. The bail handle 6 and the bail handle rest 39 in this position secure the assembly of the motor base 2, juicer bin 10, and juicer bin lid 30. Securing the assembly of the motor base 2, juicer bin 10, and juicer bin lid 30 can better ensure the aforementioned assembly remains in place and safe operation of the improved juicer 1. Additionally, the motor base 2 can have one or more microswitches that can be used to enable the motor to be activated. The bail handle 6 can actuate a microswitch that enables the motor to be activated when rotated from a lower horizontal bail handle position to a higher vertical bail handle position. Such a configuration can include multiple microswitches. Such a configuration can also be used with a motor base adapter enabling the motor base 2 and motor to be used with other devices that can actuate one or more microswitches for a similar motor enablement. This can provide additional safety to the improved juicer 1.

Figure 3:
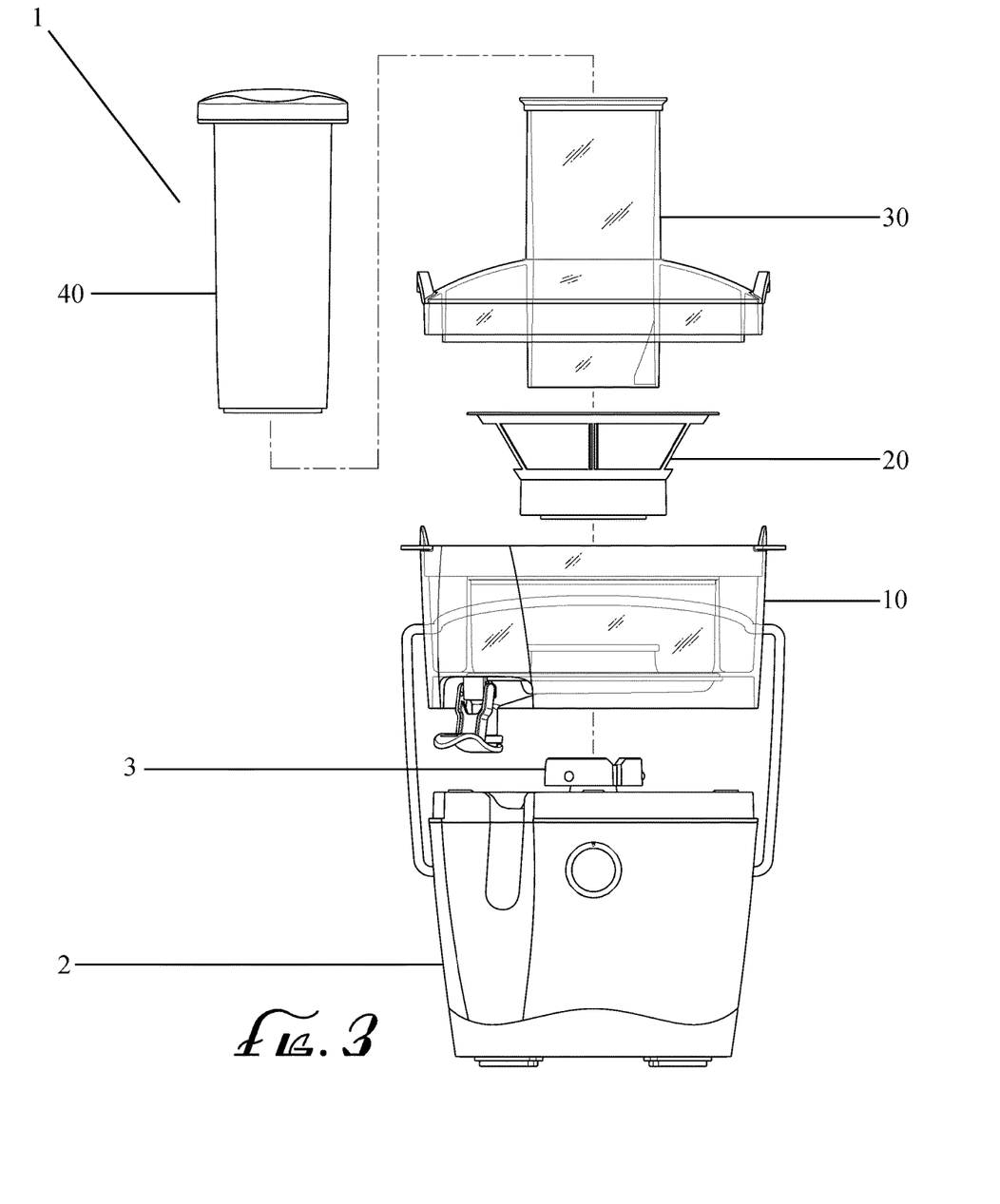
FIG. 3 is a front perspective exploded view of the improved juicer of FIG. 1.

FIG. 3 demonstrates the improved juicer 1 in a front perspective exploded view with the motor base 2, juicer bin 10, sieve basket 20, juicer bin lid 30, and pusher 40 in an assembly order. A motor base coupling 3 is shown on top of the motor base 2 and under the juicer bin 2. The motor base coupling 3 can be coupled with the sieve basket 20 to enable the sieve basket to be rotated by the motor within the motor base 2. Alternatively, a motor base adapter can also be fitted between the motor base coupling 3 and the sieve basket 20.

Figure 4:
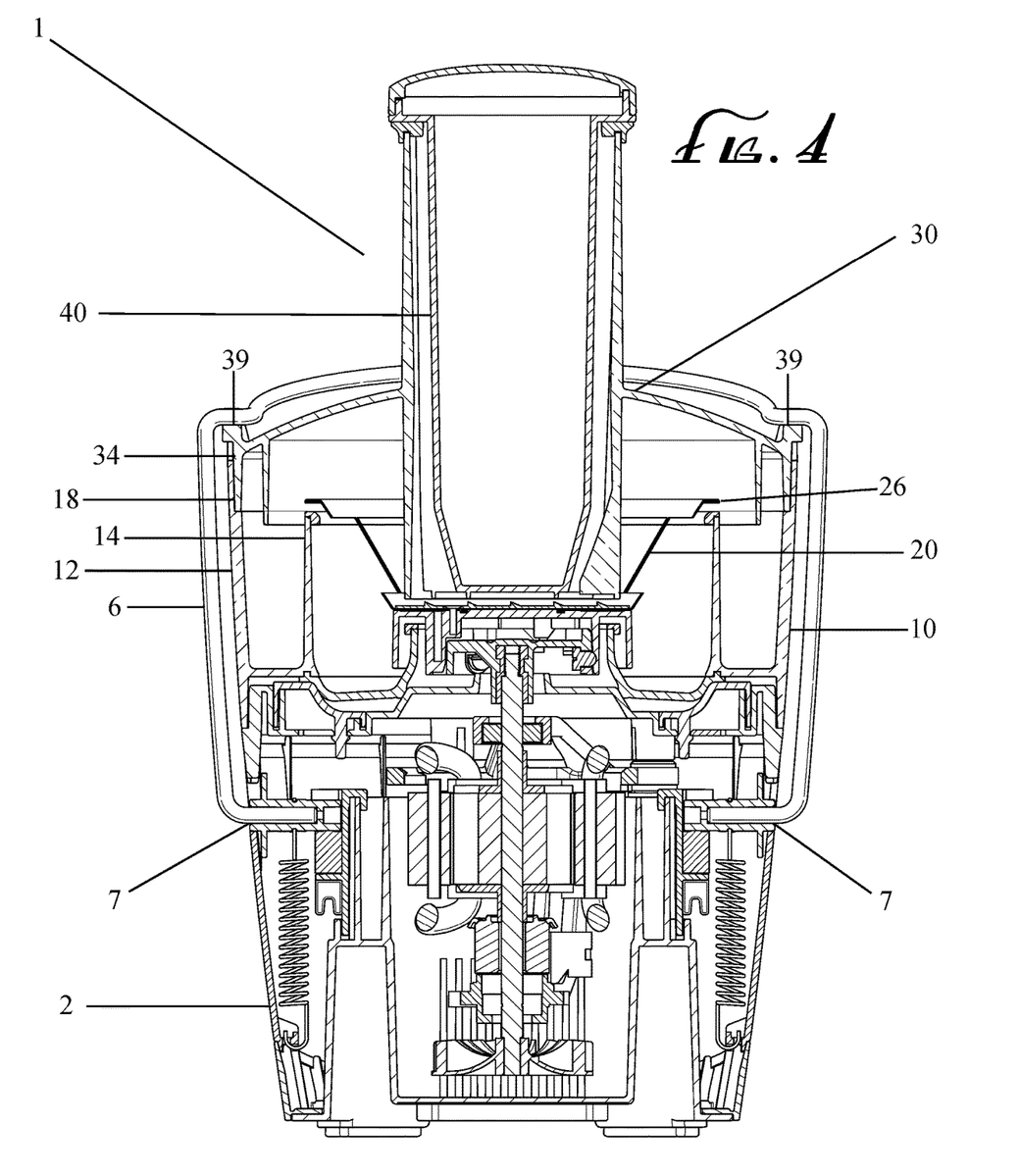
FIG. 4 is a front perspective cutaway view of the improved juicer of FIG. 1.

FIG. 4 demonstrates a cutaway front perspective view of the improved juicer 1 with the motor base 2, juicer bin 10, sieve basket 20, juicer bin lid 30, and pusher 40 assembled. The springs shown attached to the bail handle pivot points 7 create tension with the bail handle 6 in the vertical bail handle position resting on top of bail handle rest 39. The sieve basket top lip 26 is shown adjacent to the top surface of the inner juicer bin wall 14. The outer juicer bin lid wall 34 is shown fitted inside the outer juicer bin wall 12 at juicer bin top recess 18. The inner juicer bin lid wall 36 is shown extending from the bottom surface of the juicer bin lid 30. The bottom of the inner juicer bin lid wall 36 extends beyond the bottom of the outer juicer bin lid wall 34. The bottom of the inner juicer bin lid wall 36 also extends beyond the top of the inner juicer bin wall 14 and the sieve basket top lip 26.

FIGS. 5 through 8 demonstrate the juicer bin lid 30 and the inner juicer bin lid wall 36 for blocking pulp as part of the improved juicer 1 shown from various perspectives.

Figure 5:
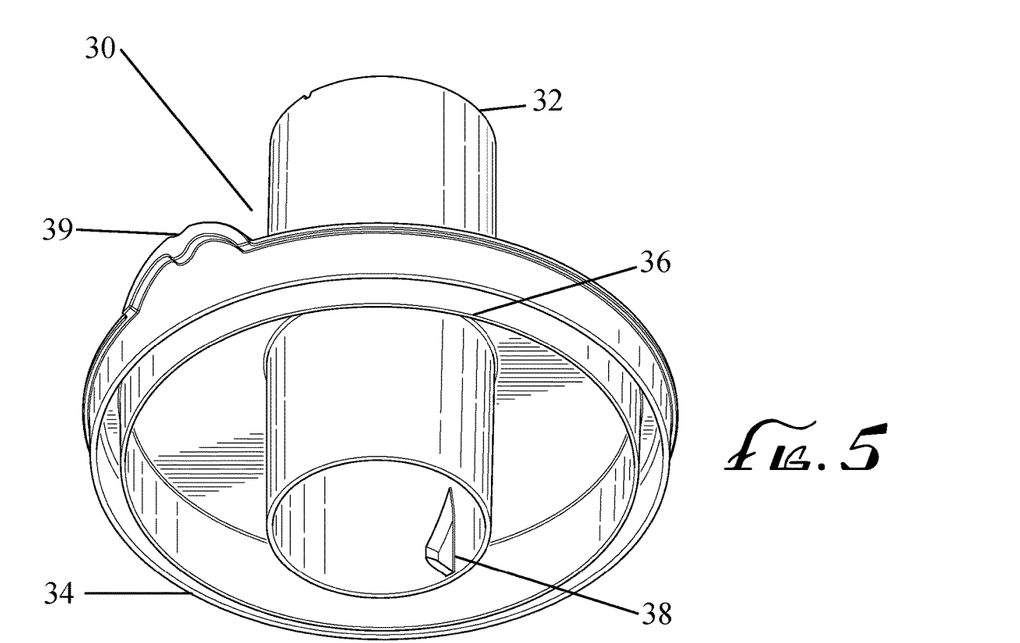
FIG. 5 is a front perspective view of a juicer bin lid with an inner juicer bin lid wall of the improved juicer of FIG. 1.

FIG. 5 demonstrates the juicer bin lid 30 and the feeding tube 32. The juicer bin lid 30 as shown is designed to be rested on top of the juicer bin 10. The outer juicer bin lid wall 34 is shown extending from the bottom surface of the juicer bin lid 30. The outer juicer bin lid wall 34 is shown with a circumference defining the outer edge of the juicer bin lid 30. The inner juicer bin lid wall 36 is shown extending from the bottom surface of the juicer bin lid 30. The inner juicer bin lid wall 36 as shown is designed to block pulp from impacting and interfering with the seal formed between the juicer bin lid 30 and the juicer bin 10. The feeding tube 32 is designed to accept and guide foodstuff such as an apple to the processing area 28 of the improved juicer 1. The feeding tube 32 as shown is complimentary to the pusher 40 for pushing foodstuff down the feeding tube 32. Also shown is a feeding tube guide tab 38 protruding from the inner surface of the feeding tube 32. The feeding tube guide tab 38 guides the pusher 40 down feeding tube 32. The bail handle rest 39 is also shown on the upper and outer surface of the juicer bin lid 30.

Figure 6:
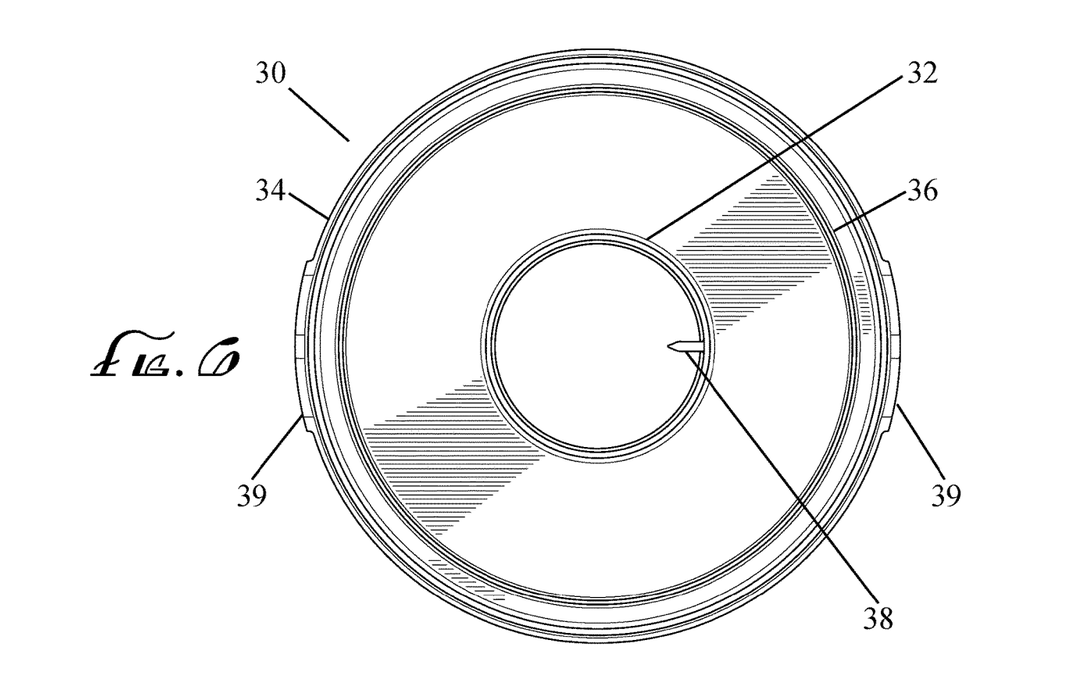
FIG. 6 is a top perspective view of the juicer bin lid of FIG. 5.

FIG. 6 demonstrates the juicer bin lid 30 from a top perspective view. The feeding tube 32 is shown in the center of the juicer bin lid 30 with feeding tube guide tab 32 protruding from the inner surface of the feeding tube 32. The inner juicer bin lid wall 36 is shown with a circumference larger than the circumference of the feeding tube 32. The outer juicer bin lid wall 34 is shown with a circumference larger than the circumference defined by the inner juicer bin lid wall 36. The bail handle rests 39 are shown positioned near the outer juicer bin lid wall 34.

Figure 7:
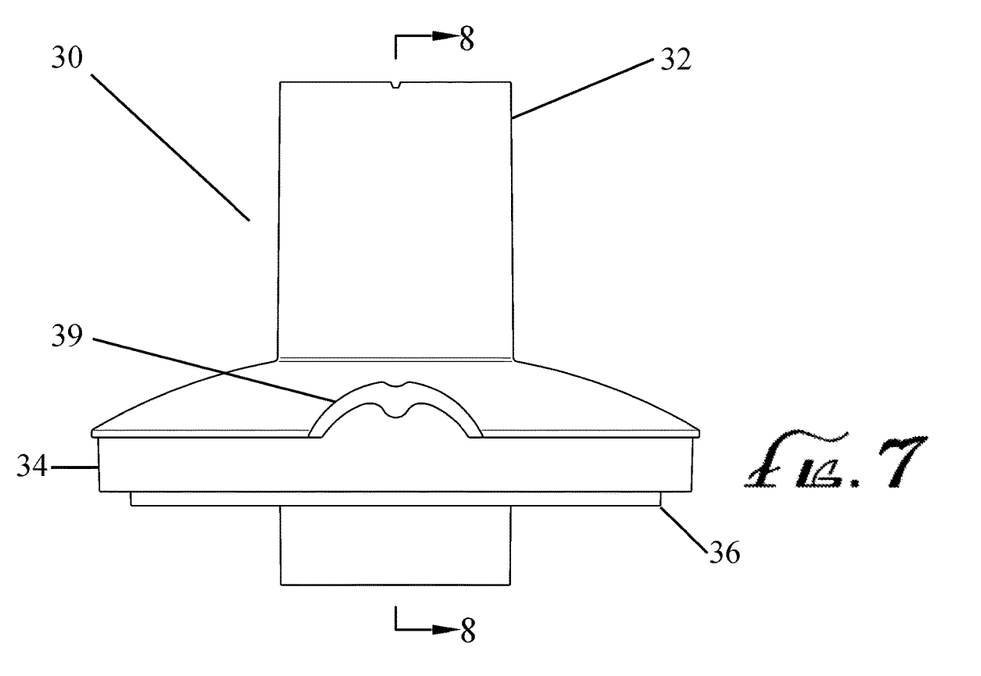
FIG. 7 is a side perspective view of the juicer bin lid of FIG. 5.
Figure 8:
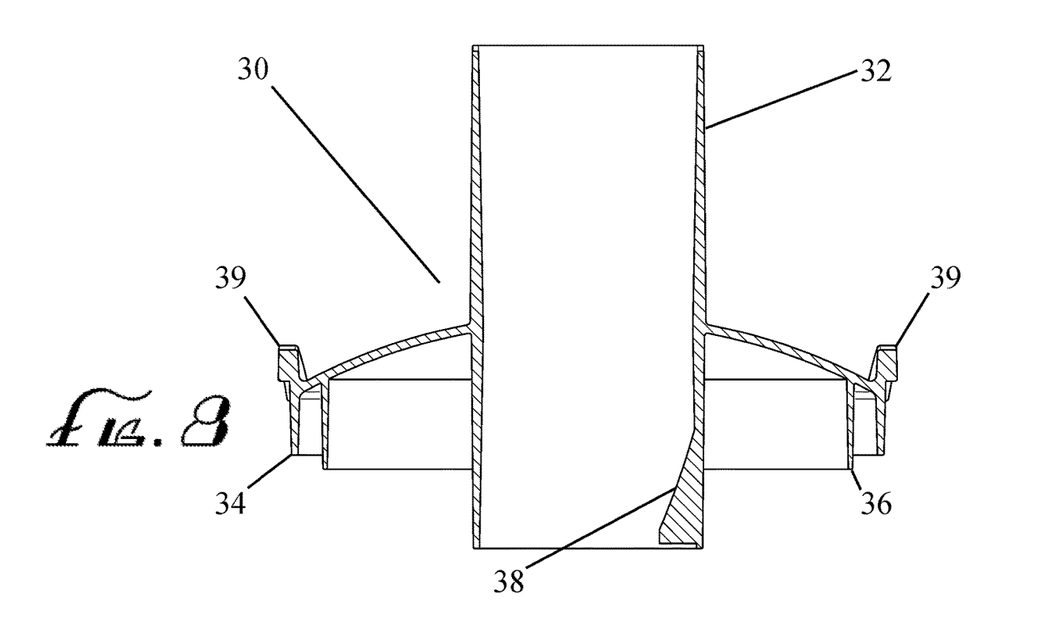
FIG. 8 is a side perspective cutaway view of the juicer bin lid of FIG. 5.

FIGS. 7 and 8 respectively demonstrate a side perspective view and a side perspective cutaway view of the juicer bin lid 30. The side perspective view of FIG. 3 shows the feeding tube 32 having a vertical length extending from beyond the top surface of the juicer bin lid 30 to beyond the bottom surface of the juicer bin lid 30. The outer juicer bin lid wall 34 is shown extending from the bottom surface of the juicer bin lid 30 with a length that does not reach the bottom of the feeding tube 32. The inner juicer bin lid wall 36 is shown extending from the bottom surface of the juicer bin lid 30 with a length that is longer than the length of the outer juicer lid wall 34. The inner juicer bin lid wall 36 is shown to also have a length that does not reach the bottom of the feeding tube 32. The side perspective cutaway view of FIG. 8 shows the feeding tube 32, outer juicer bin lid wall 34, inner juicer bin lid wall 36, and feeding tube guide tab 38. The bail handle rest 39 shown in both FIGS. 7 and 8 is near the outer juicer bin lid wall 34. The perspective view of the juicer bin lid 30 between FIGS. 7 and 8 is rotated 90 degrees to better display the feeding tube guide 38 and the bail handle rest 39.

FIGS. 9 through 12 demonstrate a second embodiment of the improved juicer 1 from various perspectives.

Figure 9:
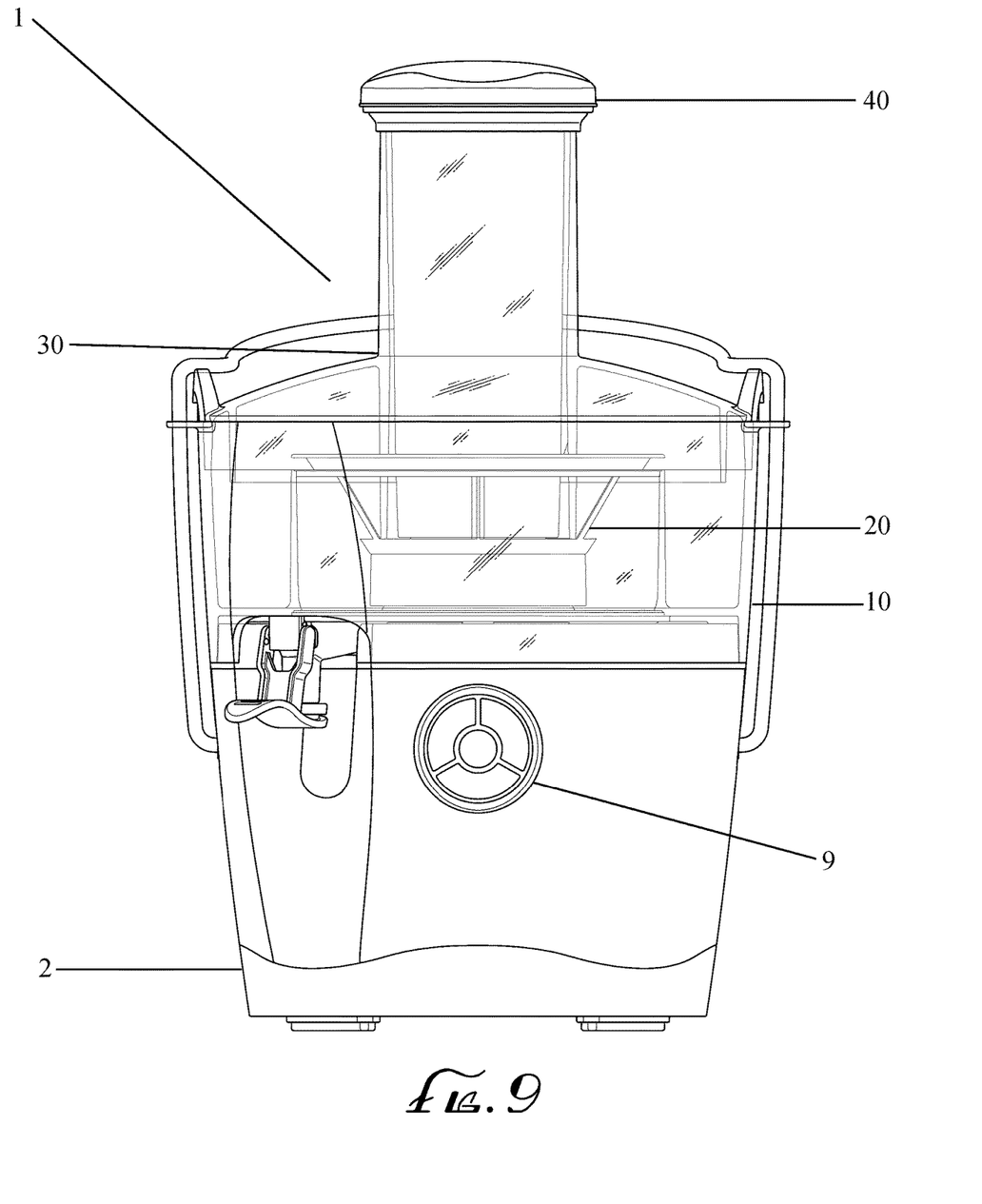
FIG. 9 is a front perspective view of a second embodiment of the improved juicer.

FIG. 9 demonstrates the improved juicer 1 from a front perspective view. The motor base 2, juicer bin 10, sieve basket 20, juicer bin lid 30, and pusher 40 are shown assembled. An actuation button assembly 9 is shown on the outer surface of the motor base 2 and can be used by a user to control the operation of the improved juicer 1. For example, the actuation button assembly 9 actives the motor within the motor base 2 or control the speed of the motor.

Figure 10:
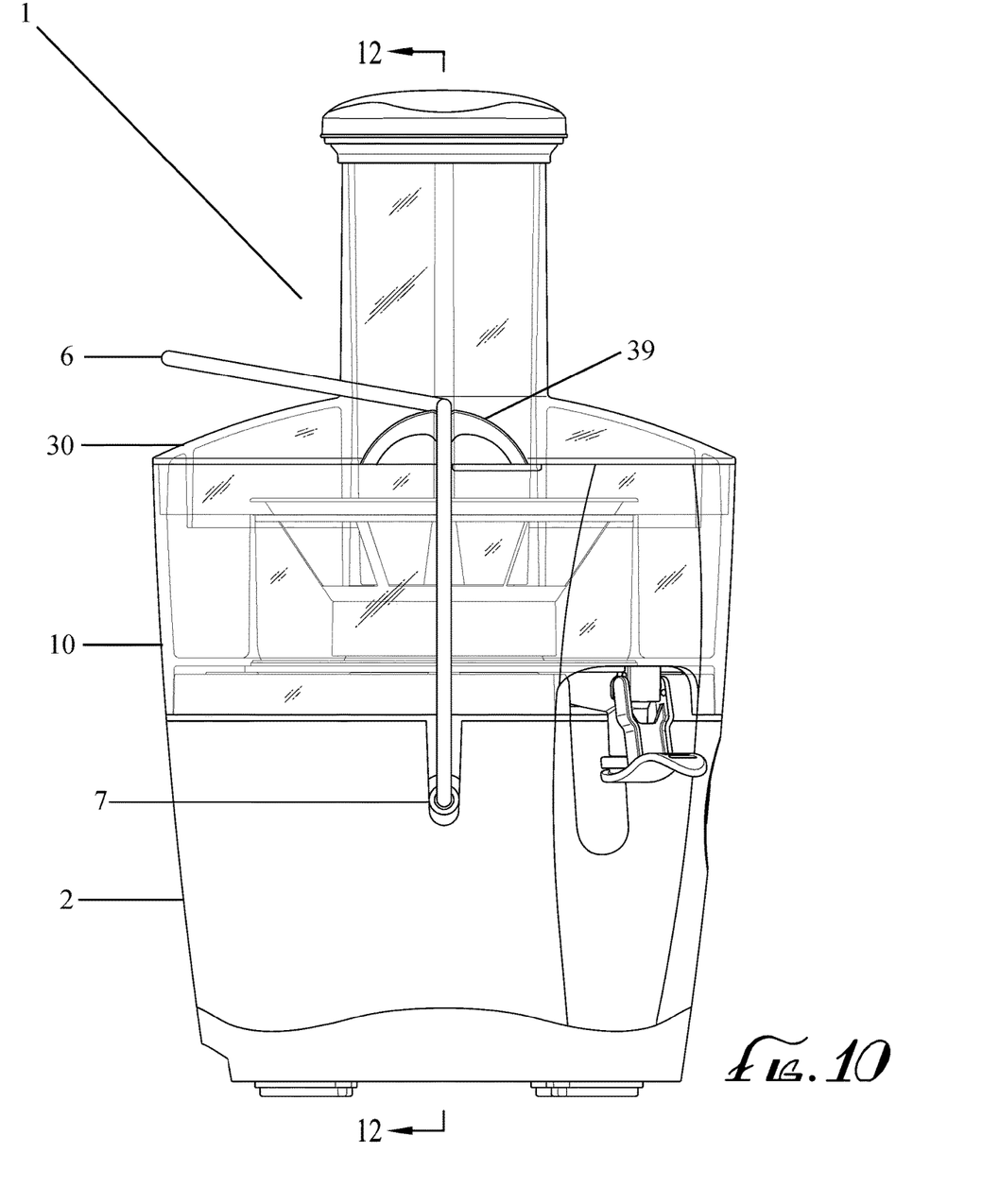
FIG. 10 is a side perspective view of the improved juicer of FIG. 9.
Figure 11:
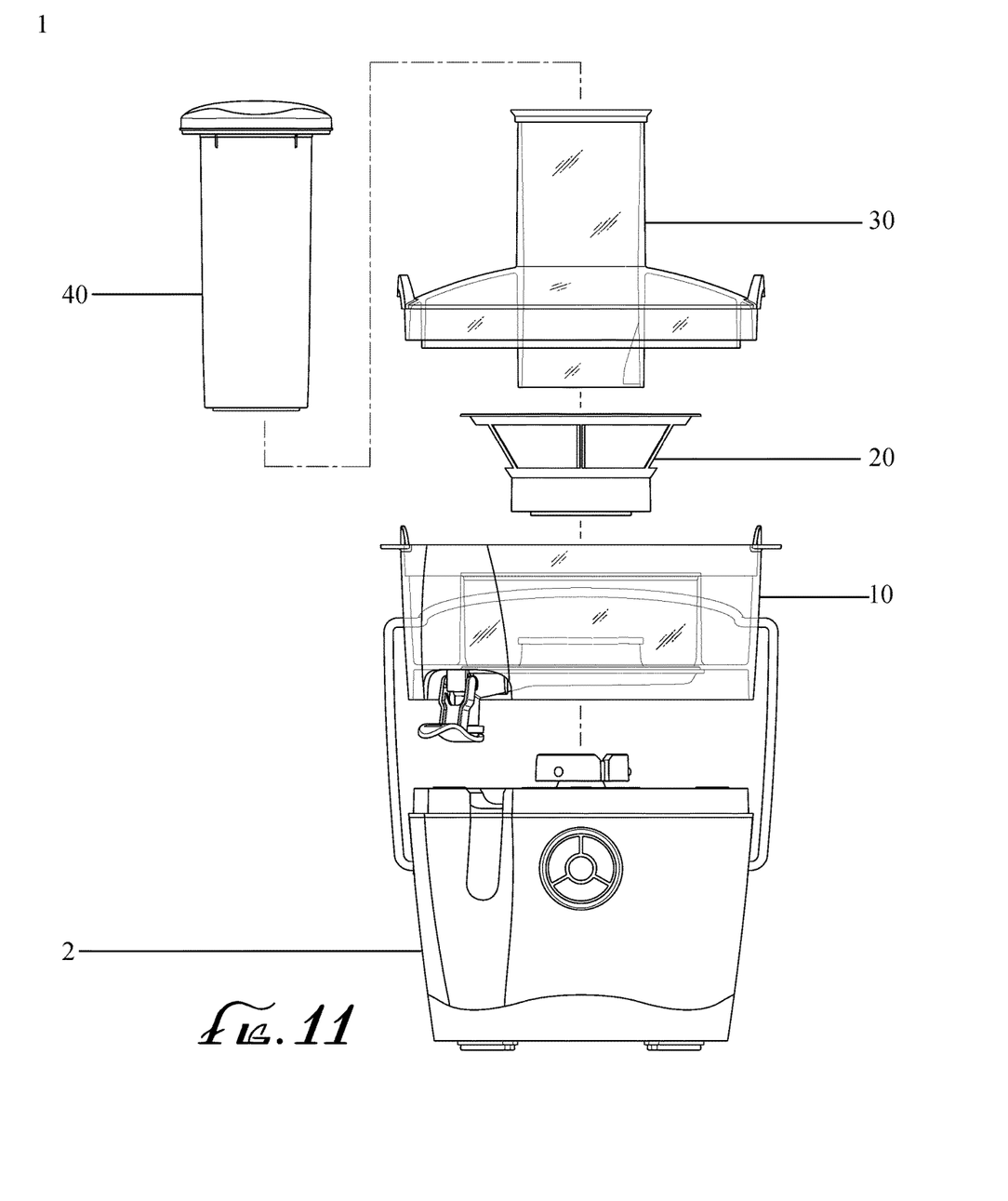
FIG. 11 is a front perspective exploded view of the improved juicer of FIG. 9.
Figure 12:
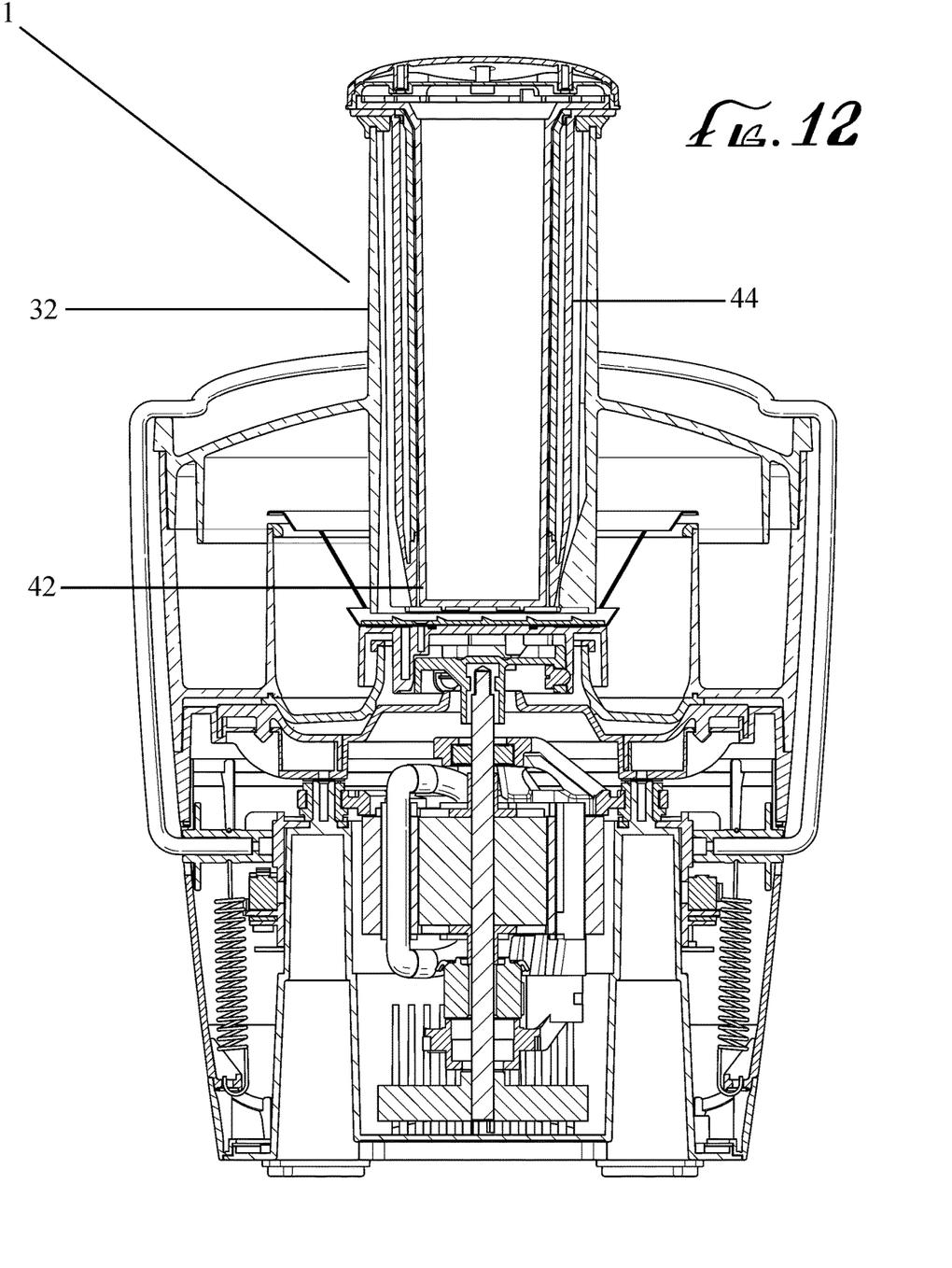
FIG. 12 is a front perspective cutaway view of the improved juicer of FIG. 9.

FIG. 10 demonstrates the improved juicer 1 from a side perspective view. The motor base 2, juicer bin 10, sieve basket 20, juicer bin lid 30, and pusher 40 are shown assembled with the bail handle 6 in a vertical bail handle position within bail handle rest 39. FIG. 11 demonstrates the improved juicer 1 from a front perspective exploded view with the motor base 2, juicer bin 10, sieve basket 20, juicer bin lid 30, and pusher 40 in an assembly order. FIG. 12 demonstrates the improved juicer 1 from a front perspective cutaway view. A narrow pusher 42 and a narrow pusher chute 44 are shown inside the feeding tube 32. The narrow pusher chute 44 narrows the effective cavity area of the feeding tube 32 and the narrow pusher 42 is fitted to push foodstuffs down the pathway created by the narrow pusher chute 44. This assembly can better process smaller foodstuffs such as those significantly narrower than the effective cavity area of the feeding tube 32.

What is claimed is:

1. A juicer for a processing of a foodstuff to produce a pulp and a juice, said juicer comprising:
   a motor base, said motor base having a motor,
   a juicer bin with an open top, said juicer bin having:
      an inner juicer bin wall; and
      an outer juicer bin wall;
   wherein said motor base is adapted to receive said juicer bin;
   a sieve basket, said sieve basket having:
      a sieve basket bottom; and
      a sieve wall;
   wherein said sieve basket is adapted to be coupled with said motor;
   a juicer bin lid adapted to form a seal with said juicer bin, said juicer bin lid having:
      a feeding tube;
      an outer juicer bin lid wall extending peripherally around the juicer bin lid and adapted to form a seal with said outer juicer bin wall;
      an inner juicer bin lid wall extending downward from the bottom of said juicer bin lid farther than the outer juicer bin lid wall; and
   a pusher for pushing said foodstuff down said feeding tube during said processing;
   wherein said outer juicer bin lid wall and said inner juicer bin lid wall are formed in the shape of concentric cylinders, whereby said inner juicer bin lid wall blocks said pulp produced during said processing from impacting said outer juicer bin lid wall during operation.

2. The juicer according to claim 1, wherein the area inside said inner juicer bin wall defines a juice collection chamber;
   wherein the area inside said outer juicer bin wall and outside said inner juicer bin wall defines a pulp collection chamber;
   wherein said inner juicer bin wall is adapted to surround said sieve basket.

3. The juicer according to claim 1, wherein said motor rotates said sieve basket when said sieve basket is coupled to said motor and said motor is operated;
   wherein said rotation of said sieve basket creates a centrifugal force;
   wherein said centrifugal force moves said juice produced during said processing through said sieve wall to said juice collection chamber;
   wherein said centrifugal force moves said pulp produced during said processing to said pulp collection chamber.

4. The juicer according to claim 1, wherein said sieve wall is in a frustoconical shape with a sieve wall bottom end fitted around said sieve basket bottom; and
   a sieve wall top end with a circumference larger than the circumference of said sieve basket bottom.

5. The juicer according to claim 1, wherein said inner juicer bin lid wall has a circumference larger than the circumference of said inner juicer bin wall;
   wherein said inner juicer bin lid wall has a circumference smaller than the circumference of said outer juicer bin wall.

6. The juicer according to claim 1, wherein said pusher is fitted to the approximate size and shape of said feeding tube.

7. The juicer according to claim 1, said juicer bin further comprising a spout.

8. The juicer according to claim 1, wherein said sieve basket bottom is grated.

9. The juicer according to claim 1, said juicer bin further comprising a bail handle.

10. The juicer according to claim 9, wherein said bail handle locks said juicer bin lid onto said juicer bin by rotating from a first bail handle position to a second bail handle position.

11. The juicer according to claim 10, whereby moving said bail handle from said first bail handle position to said second bail handle position triggers a microswitch that actuates the motor for operation.

12. The juicer according to claim 11, wherein said first bail handle position being a horizontal bail handle position and said second bail handle position being a vertical bail handle position.

13. The juicer according to claim 1, said juicer further comprising:
 a motor base adapter, said motor base adapter adapted to enable said motor base to receive said juicer bin.

14. A juicer for a processing of a foodstuff to produce a pulp and a juice, said juicer comprising:
 a motor base, said motor base having a motor;
 a juicer bin with an open top, said juicer bin having:
  a spout;
  an inner juicer bin wall; and
  an outer juicer bin wall;
 wherein said motor base is adapted to receive said juicer bin;
 wherein the area inside said inner juicer bin wall defines a juice collection chamber;
 wherein the area inside said outer juicer bin wall and outside said inner juicer bin wall defines a pulp collection chamber;
 a sieve basket, said sieve basket having:
  a sieve basket bottom, said sieve basket bottom being grated; and
  a sieve wall, said sieve wall being in a frustoconical shape with a sieve wall bottom end fitted around said sieve basket bottom and a sieve wall top end with a circumference larger than the circumference of said sieve bottom end;
 wherein said sieve basket is adapted to be coupled with said motor;
 wherein said inner juicer bin wall is adapted to surround said sieve basket;
 wherein said motor rotates said sieve basket when said sieve basket is coupled to said motor and said motor is operated;
 wherein said rotation of said sieve basket creates a centrifugal force;
 wherein said centrifugal force moves said juice produced during said processing through said sieve wall to said juice collection chamber;
 wherein said centrifugal force moves said pulp produced during said processing to said pulp collection chamber;
 a juicer bin lid adapted to form a seal with said juicer bin, said juicer bin lid having:
  a feeding tube;
  an outer juicer bin lid wall extending peripherally around the juicer bin lid and adapted to form a seal with said outer juicer bin wall;
  an inner juicer bin lid wall extending downward from the bottom of said juicer bin lid farther than the outer juicer bin lid wall; and
 wherein said inner juicer bin lid wall has a circumference larger than the circumference of said inner juicer bin wall;
 wherein said inner juicer bin lid wall has a circumference smaller than the circumference of said outer juicer bin wall; and
 a pusher for pushing said foodstuff down said feeding tube during said processing;
 wherein said pusher is fitted to the approximate size and shape of said feeding tube;
 wherein said outer juicer bin lid wall and said inner juicer bin lid wall are formed in the shape of concentric cylinders, and whereby said inner juicer bin lid wall blocks said pulp produced during said processing from impacting said outer juicer bin lid wall during operation.

15. The juicer according to claim 14, said juicer further comprising a bail handle.

16. The juicer according to claim 15, wherein said bail handle locks said juicer bin lid onto said juicer bin by rotating from a first bail handle position to a second bail handle position;
 whereby moving said bail handle from said first bail handle position to said second bail handle position triggers a microswitch that actuates the motor for operation.

17. The juicer according to claim 14, said juicer further comprising:
 a juicer adapter base, said juicer adapter base adapted to enable said motor base to receive said juicer bin.

18. A method of manufacturing a juicer for processing a foodstuff to produce a pulp and a juice and capable of blocking said pulp from interfering with said processing, the method comprising:
 producing a motor base;
 producing a juicer bin with an open top, said juicer bin having;
  an inner juicer bin wall; and
  an outer juicer bin wall;
 adapting said motor base to receive said juicer bin;
 producing a sieve basket with a grated sieve basket bottom;
 producing a juicer bin lid sized to form a seal with said juicer bin, said juicer bin lid produced to have:
  a feeding tube;
  an outer juicer bin lid wall extending peripherally around the juicer bin lid and adapted to form a seal with said outer juicer bin wall;
  an inner juicer bin lid wall extending downward from the bottom of said juicer bin lid farther than the outer juicer bin lid wall; and
  wherein said outer juicer bin lid wall and said inner juicer bin lid wall are formed in the shape of concentric cylinders, whereby said inner juicer bin lid wall blocks said pulp produced during said processing from impacting said outer juicer bin lid wall during operation;
 producing a pusher for pushing said foodstuff down said feeding tube; and
 manufacturing said motor base, said juicer bin, said sieve basket, said juicer bin lid, and said pusher to be assembled together.

* * * * *